United States Patent Office 2,765,990
Patented Oct. 9, 1956

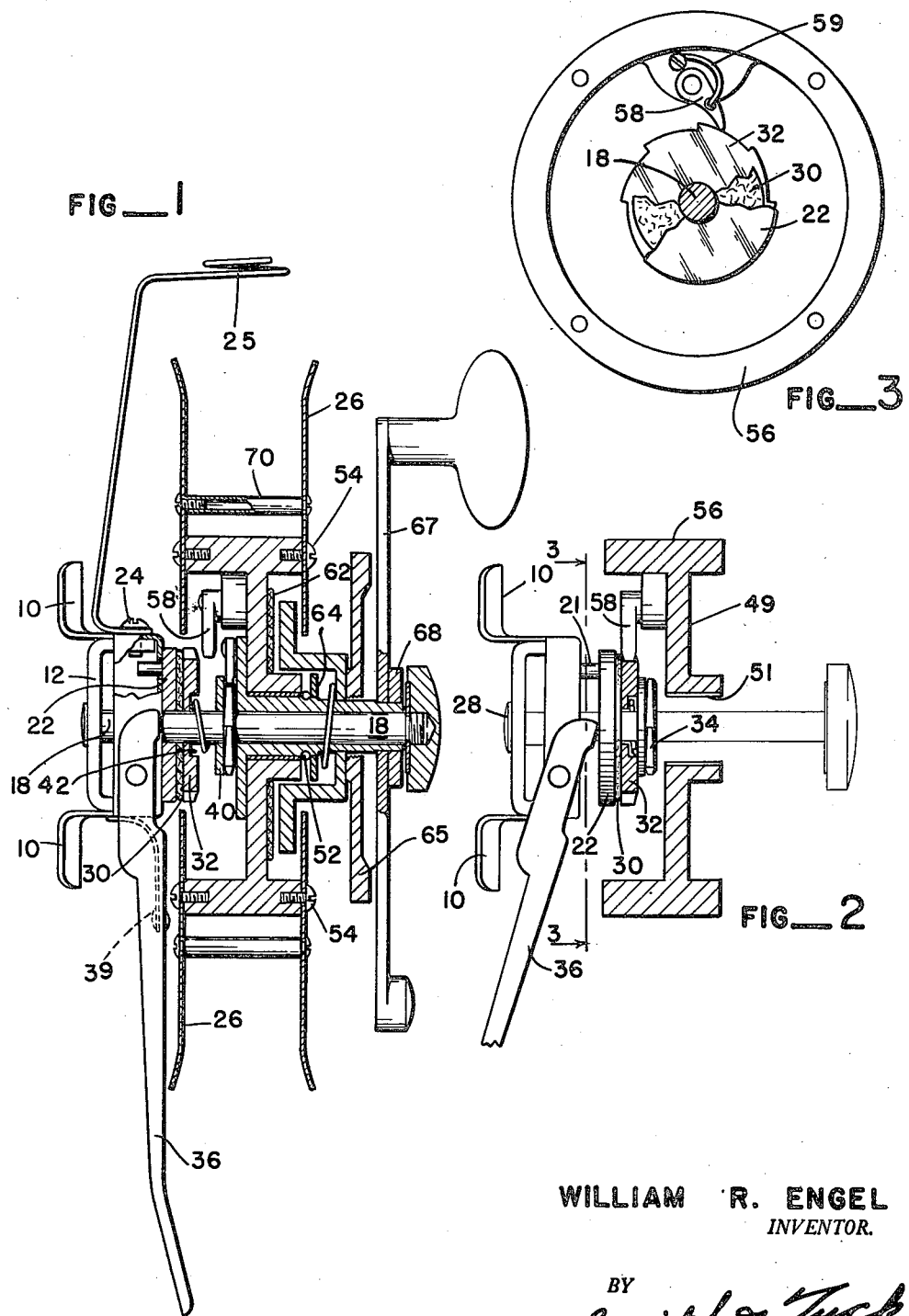

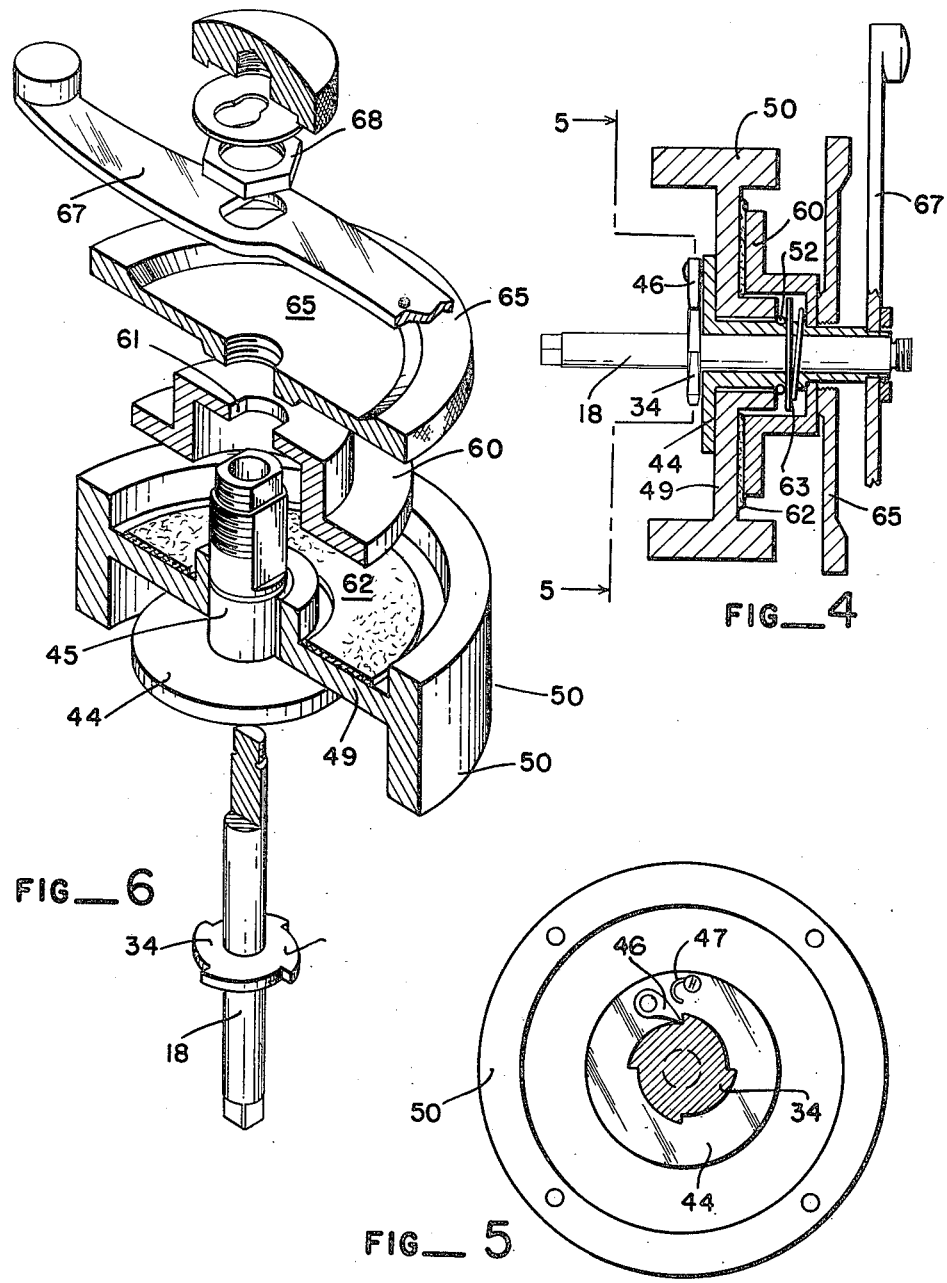

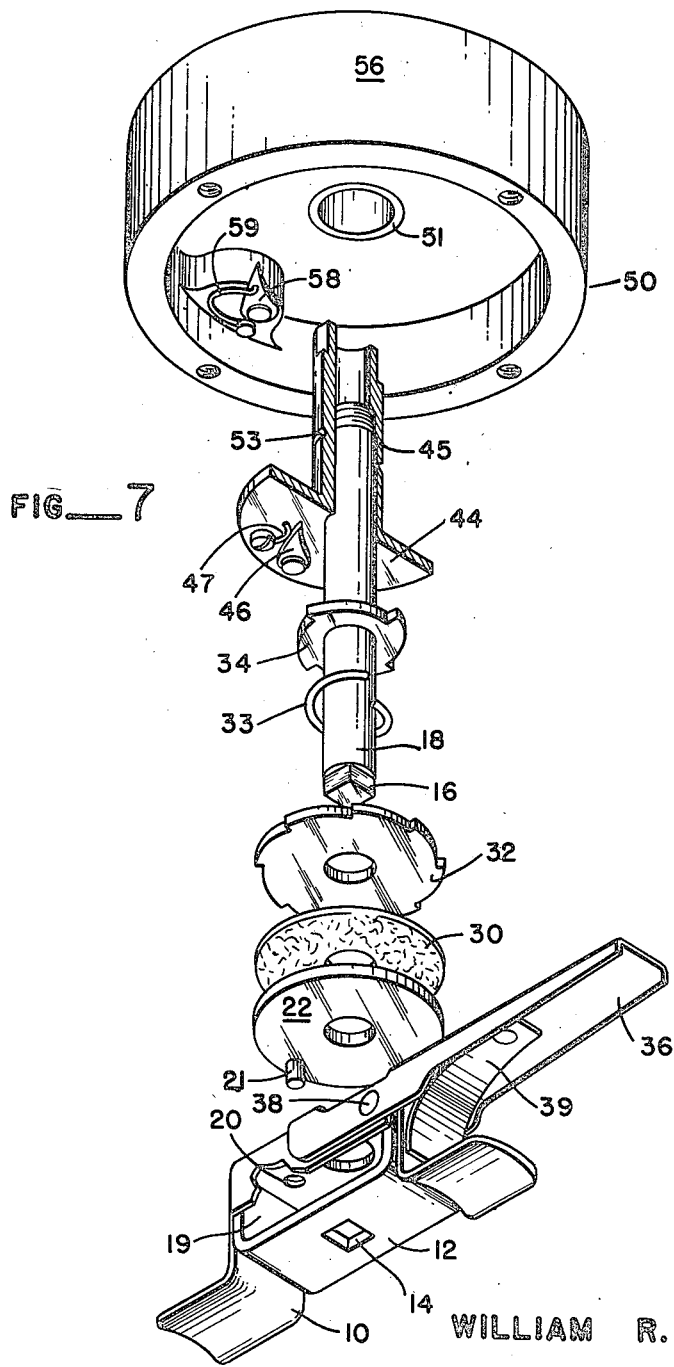
FIG.__7

2,765,990

FISHING REEL

William R. Engel, Seattle, Wash., assignor of one-third to Donald Hugh Hedges, Seattle, and one-third to K. G. Reilly, King County, Wash.

Application November 27, 1953, Serial No. 394,569

4 Claims. (Cl. 242—84.5)

This present invention relates to the general art of sport fishing reels, and more particularly, to a reel intended for use in trolling, casting, and general fishing for the larger game fish. The unique feature of this present reel is in providing the reel with shiftable controls so that the fisherman can at all times retain control of the line-carrying spool even when the fish engaged is so large that it is not practical to attempt to actually stop his runs except by braking the line and thus tiring the fish.

This present invention may be considered a development of the one shown in U. S. Letters Patent No. 2,548,174. It provides, however, for additional functions not present in the former patent.

In the past a large variety of fishing reels have been provided for the taking of heavy fish. Many of these reels are truly works of art with a multiplicity of controls that gives the angler almost any action he may desire. However such reels are characterized by a multiplicity of parts, many of them quite small, so that the durability of such equipment is usually of a low order. Probably the greatest objection to so many of these excellent reels that are available in the market is that the very close tolerances required in their manufacture, and the multiplicity of parts, makes the price of the reels so high as to be beyond the reach of the millions of people who enjoy fishing. The reel of this present invention is characterized by having a relatively large diameter open spool so that a large amount of line can be carried; and due to the open construction, the line will dry out easily without the necessity of removing it from the spool as is common with many of the higher-priced reels. The employment of a large-diameter spool makes it relatively easy to provide the various actions required in this type of fishing, but due to the diameter of the spool, these parts can be kept of simple structure and large enough so as to on one hand insure adequate strength, so that long life can be expected without undue attention, and finally, to have construction where tolerances are not critical except possibly some of the bores, which lend themselves to reaming to exact size very easily and economically. It is therefore believed that this reel supplies a great demand for a reel that will provide the niceties of operation of the large, expensive reels but which can be made very economically and thus be capable of being sold to the very large number of fishermen who heretofore have been denied the niceties of construction that add so much to their fishing enjoyment.

The principal object of this present invention is to provide a fishing reel for large fish which is characterized by its simple construction which admits of ruggedness and low cost of manufacture.

A further object of this invention is to provide a free-spool reel which can be quickly brought under the control of the user should a large fish be caught.

A further object of this invention is to provide a large braking area which is readily adjustable to the weight of drag required and which also provides a frictional engagement between the operating handle and the line-carrying spool.

A further object of this invention is to provide a second brake means which can be very easily and selectively engaged by one or two fingers of the fisherman's hand that is holding the pole to the end that the combined braking effect can be better and more easily adjusted to the strain on the fishing line.

Further objects, advantages and capabilities will be apparent from the description and the disclosure in the drawings, or may be comprehended or are inherent in the device.

In the drawings:

Figure 1 is a cross-sectional view taken through the center of a reel made after the teachings of this present invention;

Figure 2 is a sectional view showing a portion of the mechanism of Figure 1 in a different phase position;

Figure 3 is a cross-sectional view taken along the line 3—3 of Figure 2;

Figure 4 is a cross-sectional view taken in the same plane as Figure 2 but showing certain of the mechanisms in a different operating position;

Figure 5 is a cross-sectional view taken along the line 5—5 of Figure 4;

Figure 6 is an exploded perspective view illustrating the parts of the right hand side of Figure 1; and Figure 7 is an exploded, perspective view illustrating the various parts shown on the left hand side of Figure 1.

Referring more particularly to the disclosure in the drawings, the numeral 10 designates the reel seat clip. This is a more or less conventional arrangement to fit the usual fishing pole reel seat. The clip is formed intermediate its two ends so as to provide a housing for the clip base 12. This base is provided with a squared, or otherwise deformed, opening 14 adapted to form a seat for the similarly configured end 16 of shaft 18. The housing portion 19 of the reel seat clip 10 is provided with a round opening through which shaft 18 passes, and a second opening as 20 adapts to receive a pin 21 which in turn is fixedly secured to slidable plate 22. The arrangement of openings 20 and 21 provides in effect a key means so that the slidable plate cannot revolve. Secured to the reel seat clip and the clip base as by screw 24 is the resilient line guide 25. This member is preferably made of spring wire with an open loop disposed at right angles to the reel spool in the plane of reel 26 and serves to guide the line thereon and to prevent the same from looping around the reel body.

Shaft 18 is preferably fixedly secured to clip base 12 as by having a deformed end 16 passing therethrough and being riveted over as at 28 on the outside of the base so that in effect the shaft is a fixture with the base. This is particularly desirable in that the positioning and securing in place of the various parts of the reel are dependent upon shaft 18. This construction has been found more desirable than the more or less conventional housing-in of the parts. In this manner, the reel readily dries out without disassembly which is a desirable-distinction from the ordinary reel in which it is quite customary to have to disassemble the two end housings in order that water may be drained out of the same.

Disposed upon shaft 18 in sequence is the slidable plate 22, the friction washer or disc 30, the main ratchet 32, a compression spring 33, and the handle control ratchet 34. These parts form a friction clutch to prevent undue shock when the ratchet is engaged under load. Ratchet 34 is either formed as part of, or preferably, formed separately, and then fixedly secured, to shaft 18. It is desirable that the ratchet cannot move on shaft 18 as it forms the abutment for the clutching mechanism employing the braking disc 30, which in turn is operated by the brake lever 36 which is pivotably secured as at 38 to housing 19. Lever 36 is provided with a spring 39 disposed to normally maintain handle 36 in a neutral position particularly as illustrated in Figure 1.

Intermediate spring 33 and ratchet 34 a washer 40 may be provided to reduce friction under certain conditions as illustrated in Figure 2. This washer, which is optional, is illustrated in Figures 1 and 2. It is to be noted that the main ratchet 32 is mounted for free rotation on shaft 18 and compression spring 33 tends at all times to keep it in engagement with friction disc 30. However when the clutch mechanism is being employed as such, after the showing of Figure 2, it is then necessary that the ratchet come into a firm abutment either with washer 40 or the handle control ratchet 34. Consequently the main ratchet must be recessed as at 42 so that spring 33 will not prevent this action.

Disposed outwardly from handle control ratchet 34 is the unit comprising the backing plate 44 and the hollow spindle 45. These two members are preferably formed as one unit and are revolvably disposed upon shaft 18. The inner side of backing plate 44 provides a mounting for ratchet pawl 46 and its associated spring 47. This pawl is the one which engages the handle control ratchet 34.

Revolvably positioned on spindle 45 is the spool-supporting and positioning disc 50. This disc is preferably provided with a replaceable bearing as 51 and a retaining ring 52, which in turn is adapted to seat within a groove 53 formed in the periphery of spindle 45. This insures that the spool disc will at all times be abutting the backing plate 44 and be accurately positioned which is necessary in that, in turn secured to spool disc 50 by a plurality of screws 54, after the showing of Figure 1, is the line-carrying spool 26. Inside the flange 56 of spool 50 is provided a mounting for the main ratchet pawl 58 and its associated spring 59. This pawl is disposed so that it selectively engages the main ratchet 32 when the operator moves handle 36 to the position as illustrated in Figure 2.

Slidably disposed on the hollow spindle 45, is the drag pressure plate 60. To provide slidability, yet to prevent rotation of the drag plate upon spindle 45, the spindle is provided with some keying arrangement. A satisfactory arrangement is illustrated in which the opposite sides of the spindle 45 are flattened and the opening 61 in plate 60 is formed to fit the same in a sliding manner. Disposed between web 49 of spool 50 and pressure plate 60 is a large friction disc 62. Normally a compression spring 63, with a suitable backing washer 64, is disposed to space the pressure plate and web 49 so that no pressure will be placed upon the friction disc 62. This is very desirable in a free spool reel. The free spooling position is shown in Figure 1. However when braking effort is desired on the line spool 26, drag disc 65 is revolved on spindle 45 forcing the drag pressure plate 60 to the left as viewed in Figure 4 until the desired pressure is applied to friction disc 62. It is to be noted that spindle 45 is threaded to accept disc 65, and the reaction surface of the stop plate 44 being also a part of spindle 45, enables any desired pressure to be placed upon the drag which becomes a clutching arrangement so that any degree of braking can be used, from none, as illustrated in Figure 1, to a point, after the showing of Figure 4, where the parts are locked together and there is no slippage between them.

The handle or crank 67 is adapted to be fixedly secured to the spindle 45 by lock nut 68 and the deformed end of the spindle. The torque applied to handle 67, however, is transferred to the spool by the clutch means imparting the turning effort to spool disc 50 and following the principle of star drag reels, it is therefore possible to adjust the pressure so that the handle can be turned as to wind in the line, even though the fish is actually taking line out at the same time. This arrangement makes it possible to have the drag set to a point where the tension placed upon the line is just somewhat less than its breaking point, and then as the fish slackens his gait, or turns toward the fisherman, without necessity of any movement of levers or the like, the continued winding on handle 67 retrieves the line.

In a reel of this order where the fisherman is seeking large fish, it quite often happens that the fish will strike and immediately take out line at a rapid rate and this, through the clutching effect of the drag mechanism in the usual reel, will cause the handle to spin very rapidly and make it impossible for the fisherman to gain possession of it. The brake handle ratchet 34 and its coacting pawl 46 provide a positive one-way connection between handle 57 and spool 26. In this particular reel the normal drag is set to a desired tension by disc 65 and when a fish strikes and starts taking out the line the fisherman may without removing his hands from the pole press inwardly on lever 36 and by so doing bring the additional braking disc 30 into use. The effect of this secondary braking is additive to the braking controlled by disc 62 but it might be considered to be a vernier arrangement which permits of much more accurate control of the braking effort to the end that the maximum tension which the line will safely carry can be accurately gauged and placed upon the same during the run of a fish. Due to ratchet and pawl 32 and 58 respectively, the braking effort of disc 30 acts only when the line is being taken out and not as line is being reeled in. With the main drag, controlled by disc 65, slackened off, the spool is free as for casting. Braking under these conditions may then be applied only by lever 36 engaging friction disc 30 after the showing of Figure 2. It thus provides a drive connection when the handle is turned to reel in the line, but if the fish starts taking out line, the spool 26 can turn independently of spindle 45 and handle 67 which is secured to it.

The construction of spool 26 is preferably made of two similar, but oppositely faced plates which are fixedly secured to spool disc 69 by a plurality of screws 54. A plurality of concentrically disposed pillars as 70 may be employed to prevent the line from coming in contact with the solid material of disc 50 to the end that the line can be dried faster. It naturally follows that if the pillars are removed the line capacity of the spool will be substantially increased however. One form of spool that has proven quite satisfactory is that shown in U. S. Patent No. 2,548,174. This present invention has many of the components of this patent and the general appearance is quite similar. The interior, however, is considerably advanced over that patent, and the reel is capable of many desirable modes of functioning of which the former patent is not capable. This, of course, is achieved by a substantial increase in the number of working parts.

It is believed that it will be clearly apparent from the above description and the disclosure in the drawings that the invention comprehends a novel construction of a fishing reel.

Having thus disclosed the invention, I claim:

1. A fishing reel, comprising: a central shaft and securing means secured to one end of said shaft for securing the shaft to a fishing rod in position extending laterally from said rod, a line-receiving spool having a central supporting disc rotatably mounted on said shaft, a shifting ratchet mounted on said shaft between said securing means and said supporting disc, a shifting plate mounted on said shaft between said securing means and said shifting ratchet and means preventing relative rotary movement between said shifting plate and said securing means, a friction washer positioned between said shifting ratchet and said shifting plate, spring means biasing said shifting ratchet toward a first position toward said securing means, an external shifter handle pivotally mounted on said securing means and having an inner pressure end disposed to shift said shifting plate and said shifting ratchet to a second position nearer to said supporting disc upon pivoting of said handle, said supporting disc having a pawl pivotally mounted thereon spring pressed to engage said shifting ratchet in its second position preventing relative rotary movement between the supporting disc and said shifter ratchet in one direction; and an operating handle connected to said supporting disc for rotating said spool.

2. A fishing reel, comprising: a central shaft and securing means secured to one end of said shaft for securing the shaft to a fishing rod in position extending laterally from said rod, a fixed ratchet secured on said shaft intermediate its ends, a spindle rotatably mounted on said shaft abutting said fixed ratchet on the opposite side thereof from said securing means, a line-receiving spool having a central supporting disc rotatably mounted on said spindle, said spindle having an integral flange forming a backing plate on one end positioned between said fixed ratchet and said supporting disc, said backing plate having a pivotal pawl spring pressed to engage said fixed ratchet preventing rotary movement of said spindle in one direction relative said fixed ratchet, an annular shifting pressure plate mounted on said spindle on the opposite side of said supporting disc from said backing plate by means permitting shifting of the pressure plate axiswise of said spindle and preventing relative rotary movement therebetween, said pressure plate having spring means normally biasing it away from said supporting disc and a drag disc having threaded connection with said spindle positioned on the opposite side of said pressure plate from said supporting disc and one of the adjacent surfaces of said pressure plate and supporting disc carrying a braking disc whereby an adjustable braking unidirectional action is obtained by shifting of said pressure plate into contact with said supporting disc by movement of said drag disc against said pressure plate, an operating handle mounted on the outer end of said spindle and disposed to rotate the same whereby the supporting disc and spool may be rotated by the operating handle when said pressure plate and supporting disc engage each other through said braking disc; a shifting ratchet mounted on said shaft between said securing means and said fixed ratchet, a shifting plate mounted on said shaft between said securing means and said shifting ratchet and connected to said shaft in a manner preventing relative rotary movement therebetween, a friction washer positioned between said shifting ratchet and said shifting plate, second spring means biasing said shifting ratchet toward a first position toward said securing means, an external shifter handle pivotally mounted on said securing means and having an inner pressure end operable to shift said shifting plate and said shifting ratchet to a second position nearer to said fixed ratchet, said supporting disc having a pawl pivotally mounted thereon spring pressed to engage said shifting ratchet in its second position preventing relative rotary movement between the supporting disc and said shifter ratchet in one direction.

3. A fishing reel, comprising: a central shaft and securing means at one end of said shaft for securing the shaft to a fishing rod, a first clutch member fixedly secured on said shaft intermediate its ends, a spindle rotatably mounted on said shaft abutting said clutch member on the opposite side thereof from said securing means, a line-receiving spool rotatably mounted on said spindle, said spindle having an end annular flange forming a backing plate positioned between said clutch member and said spool, said backing plate and clutch member having ratchet and pawl means engaged to prevent rotary movement therebetween in one direction, a shifting pressure plate mounted on said spindle on the opposite side of said spool from said backing plate by means preventing rotation of the pressure plate relative the spindle, frictional engaging means between said pressure plate and spool, manually adjustable means for pressing said pressure plate into frictional engagement with said spool, an operating handle secured to the outer end of said spindle, a second shifting clutch member slidably mounted on said shaft between said securing means and first clutch member, a shifting plate slidably mounted on said shaft between said securing means and said second clutch member, an external shifter handle pivotally mounted on said securing means and manually operable to shift said shifting plate and said second clutch member along said shaft to an operative position, said spool and second clutch member having interengaging ratchet and pawl means engaging in said operative position to prevent relative rotary movement therebetween in one direction.

4. A fishing reel, comprising: a nonrotatable central shaft and supporting means at one end of said shaft for supporting the shaft on a fishing rod, a line-receiving spool rotatably mounted on said shaft, a first clutch member mounted on said shaft and fixed against rotation thereon, brake means rotatable on said shaft and adjustable to frictionally bear on said spool and having unidirectional clutching means connecting with said first clutch member whereby said brake means is operative only in the direction in which said unidirectional clutching means is operative, an operating handle connected to said brake means manually operable when said brake means is tightened to rotate said spool in the direction in which said unidirectional clutching means is inoperative, a shifting clutch member rotatably supported between said spool and said supporting means and movable axiswise of said central shaft and unidirectional clutching means between said shifting clutch member and said spool only in an operative position of said shifting clutch member, manually operable means operable to shift said shifting clutch member between an inoperative position and said operative position including adjustable braking means interposed between said shifting clutch member and said supporting means and effective to restrict rotation of said shifting clutch member when tightened.

References Cited in the file of this patent

UNITED STATES PATENTS

| | | |
|---|---|---|
| 1,005,154 | Catucci | Oct. 10, 1911 |
| 1,554,786 | Case | Sept. 22, 1925 |
| 2,059,765 | Adams | Nov. 3, 1936 |
| 2,182,423 | Cabassa | Dec. 5, 1939 |
| 2,271,883 | Bannister | Feb. 3, 1942 |
| 2,460,904 | Reyburn | Feb. 8, 1949 |
| 2,548,174 | Rastler | Apr. 10, 1951 |
| 2,608,359 | Kovalovsky et al. | Aug. 26, 1952 |
| 2,648,506 | Kirby | Aug. 11, 1953 |
| 2,656,993 | Dukes | Oct. 27, 1953 |

FOREIGN PATENTS

| | | |
|---|---|---|
| 23,229 | Great Britain | of 1906 |